June 17, 1941.   M. W. FRASER   2,246,488
PLANETARY PUMP
Original Filed Aug. 15, 1939
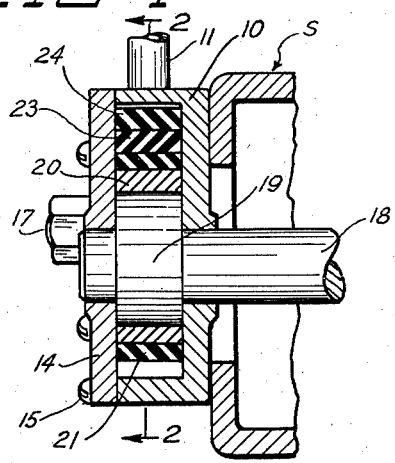
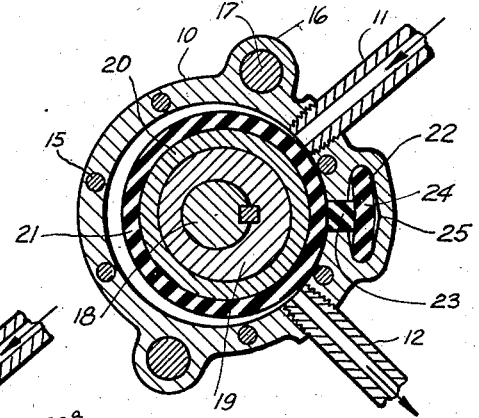
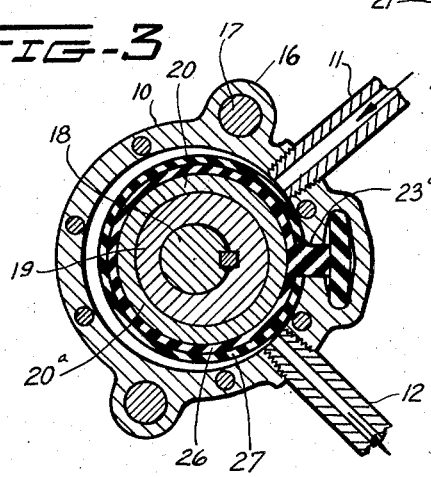
Inventor
Malcolm W. Fraser Patented June 17, 1941

2,246,488

UNITED STATES PATENT OFFICE 2,246,488

PLANETARY PUMP

Malcolm W. Fraser, Toledo, Ohio, assignor to Detroit Harvester Company, Detroit, Mich., a corporation of Michigan Original application August 15, 1939, Serial No. 290,274. Divided and this application September 4, 1940, Serial No. 355,332

3 Claims. (Cl. 103—132)

This invention relates to rotary force pumps but more particularly to planetary pumps of the type employing a rotatable eccentric disc and an object is to produce a new and improved planetary pump of this character in which the rotatable eccentric rotates relatively to a concentric member to which is bonded a layer of rubber or rubber-like material which has a partition extension arranged between the inlet and outlet ports, such extension being of relatively hard rubber and to such extension being bonded a relatively flexible or resilient rubber cross arm adapted to be disposed in sealing contact with opposed walls of a cavity formed in the casing.

Other objects and advantages of the invention will hereinafter appear and for purposes of illustration but not of limitation, an embodiment of the invention is shown on the accompanying drawing in which.

Figure 1 is a sectional elevation of the planetary pump and casing;

Figure 2 is a sectional view taken substantially on the line 2—2 of Figure 1; and Figure 3 is a sectional view of an alternate form of pump in which the relatively rigid or hard rubber portion encircles the metallic sleeve or bushing element, there being a relatively soft rubber layer bonded to the hard rubber layer.

This application constitutes a division of my co-pending application Serial No. 290,274, filed August 15, 1939.

The illustrated embodiment of the invention comprises a substantially cup-shaped casing or housing 10 formed with a radial inlet conduit 11 and outlet conduit 12 which are disposed in relatively close juxtaposed relation. The open end of the housing is closed by a disc 14 which is secured to the housing by screws 15. The housing in this instance has bosses 16 through which extend bolts 17 for securing the housing to a suitable support S. Having bearing in a wall of the housing 10 and in the closure plate or disc 14 is a rotary shaft 18 to which is keyed an eccentrically mounted disc 19 which approximately fills the space between the closure disc 14 and the bottom wall of the housing 10.

The eccentric disc 19 fits within a metallic sleeve or bushing 20 which is concentric with the disc which rotates relatively thereto. On the outside of the bushing is bonded a relatively flexible and resilient rubber layer 21 which in this instance is formed with a substantially T-shaped extension 22 disposed between the inlet and outlet conduits 11 and 12 respectively. The neck 23 of the T is of relatively hard rigid rubber and is bonded at one end to the relatively soft rubber layer 21 and at the opposite end to the cross portion of the T 24 which is of relatively flexible resilient rubber. The cross portion 24 is disposed in a cavity 25 formed in the casing 10 shaped snugly to fit the opposite ends of the portion 24 but sufficient space being afforded to allow the portion 24 to flex during the rotary movement of the pump.

It will be manifest that the relatively hard rubber neck 23 has a slight amount of sliding movement toward and away from the cavity 25 during the operation of the pump. It will be apparent that if desired, the neck portion may be bonded directly to the bushing instead of being bonded to the outer surface of the relatively resilient rubber layer.

Inasmuch as planetary pumps of this general character are well-known in the art, it is not considered necessary to explain the operation thereof in detail. It will be recognized that the relatively resilient rubber T of the extension yields as the eccentric disc rotates to enable the resilient rubber sleeve to be moved progressively into intimate engagement with the side walls of the pump chamber creating a fluid-tight translatory contact point with portions of the inner walls of the casing. During such movement, the relatively hard rubber neck portion will have a slight amount of rectilinear sliding movement as well as a slight amount of lateral movement in one direction or the other, the relatively resilient T extension flexing to accommodate such movements and effecting a sealing contact with opposed walls of the cavity in which it is disposed. Although a pump of this character is admirably adapted for handling fluids, it is particularly useful in the handling of liquids such, for example, as contain a certain amount of gritty substances.

The form shown in Figure 3 is similar to that shown in Figure 2 except that the metallic bushing or sleeve 20a has bonded to the outer surface thereof a relatively thin layer 26 of relatively hard or rigid rubber with which the relatively hard or rigid rubber neck 23a is integral. Bonded to the outer surface of the relatively hard rubber layer 26 is a relatively thin sleeve or layer 27 of relatively flexible and resilient rubber, this layer terminating at its ends in the rubber neck to which the ends are bonded. In this form it will be obvious that a more secure bond is effected between the hard rubber portion and the metallic sleeve 28 thus affording greater assurance that the bond between the hard rubber core and the metallic sleeve will not loosen.

It is to be understood that numerous changes in details of construction, arrangement and operation may be effected without departing from the spirit of the invention especially as defined in the appended claims.

What I claim is:

1. In a pump of the character described, a casing having spaced inlet and outlet ports, a rotatable eccentric disc within said casing, a bushing fitting said eccentric disc and being concentric thereof, a rubber layer bonded to the outer surface of said bushing, there being a substantially T-shaped cavity in said casing intermediate said inlet and outlet ports, an extension on said rubber layer bonded thereto, said extension being of rubber harder than the rubber in said layer, and a cross arm of relatively resilient rubber bonded intermediate its ends to said extension with the end portions thereof arranged to flex freely within said cavity in sealing contact with the opposed walls thereof.

2. In a pump of the character described, a casing having spaced inlet and outlet ports, a rotatable eccentric disc within said casing, a bushing fitting said eccentric disc and being concentric thereof, a rubber layer bonded to the outer surface of said bushing, there being a substantially T-shaped cavity in said casing intermediate said inlet and outlet ports, an extension projecting laterally with respect to said rubber layer and substantially fitting one portion of said cavity, said extension being of rubber harder than the rubber in said layer, and a cross arm of relatively resilient rubber bonded intermediate its ends to said extension with the end portions thereof arranged to flex freely within the other portion of said cavity in sealing contact with the opposed walls thereof.

3. In a pump of the character described, a casing having spaced inlet and outlet ports, a rotatable eccentric disc within said casing, a bushing fitting said eccentric disc and being concentric thereof, a relatively hard rubber layer bonded to the outer surface of said bushing, a relatively resilient and flexible rubber layer bonded to the outer surface of said relatively hard rubber layer, there being a substantially T-shaped cavity in said casing intermediate said inlet and outlet ports, a neck portion of relatively hard rubber integral with said hard rubber layer and projecting therefrom substantially to fit one portion of said cavity, and a cross arm of relatively resilient flexible rubber bonded intermediate its ends to said neck portion with the end portions thereof arranged to flex freely within the said cavity in sealing contact with the opposed walls thereof.

MALCOLM W. FRASER.